Figure 1:
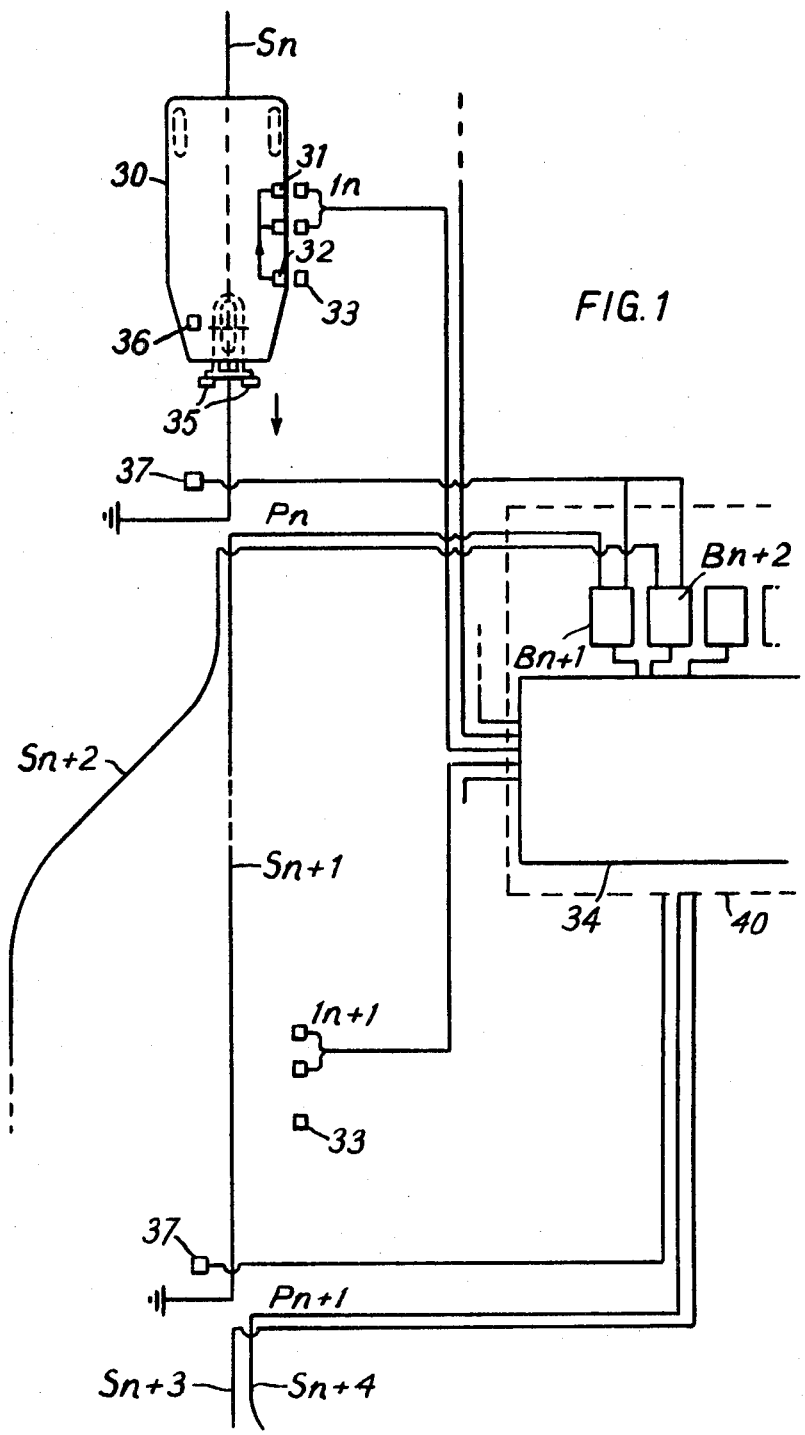

United States Patent [11] 3,610,363

| [72] | Inventor | Frederick Walter Hartley |
| | | 46, Hughes Road, Hayes, Middlesex, England |
| [21] | Appl. No. | 780,050 |
| [22] | Filed | Nov. 29, 1968 |
| [45] | Patented | Oct. 5, 1971 |
| [32] | Priority | Nov. 30, 1967 |
| [33] | | Great Britain |
| [31] | | 54450/67 |

[54] AUTOMATIC VEHICLE GUIDANCE SYSTEM
8 Claims, 2 Drawing Figs.

| [52] | U.S. Cl. | 180/98, 246/3, 246/29 |
| [51] | Int. Cl. | B62d 5/04 |
| [50] | Field of Search | 180/98, 79, 79.1, 77; 246/29, 30, 2, 3, 134 |

[56] References Cited

UNITED STATES PATENTS

| 2,847,080 | 8/1958 | Zworykin et al. | 180/79.1 X |
| 3,039,554 | 6/1962 | Hosking et al. | 180/77 |
| 3,147,817 | 9/1964 | De Liban | 180/79.1 X |
| 3,245,493 | 4/1966 | Barrett | 180/98 |
| 3,250,914 | 5/1966 | Reich | 246/30 X |
| 3,335,404 | 8/1967 | Wood | 340/348 X |
| 3,377,616 | 4/1968 | Auer | 246/29 X |
| 3,411,603 | 11/1968 | Kohls | 180/98 |
| 3,474,877 | 10/1967 | Wesener | 180/98 |
| 3,219,815 | 11/1965 | Livingston | 246/3 |

*Primary Examiner*—Kenneth H. Betts
*Attorney*—William W. Downing, Jr.

ABSTRACT: An automatic vehicle guidance system includes a plurality of vehicles each having means for indicating its identity, means associated with respective decision points in the system for deriving a signal representing the identity of a vehicle arriving at a decision point, and control means remote from the vehicles for controlling their movement. The control means include means for storing a program of decisions for each vehicle, a plurality of decision means each of which when actuated can cause selective control of a vehicle arriving at a respective decision point, sequencing means for sequentially conditioning according to each program of decisions in turn the decision means to a state in which they can be actuated and means for utilizing an identity signal to actuate the decision means for the respective decision point in such a way as to render effective the respective decision stored.

AUTOMATIC VEHICLE GUIDANCE SYSTEM

This invention relates to automatic vehicle guidance systems.

It has been proposed to provide automatic vehicle guidance systems in which a driverless tug is caused to move along a route defined by a guidance conductor laid on or just below the ground. Such a system is described for example in U.S. Pat. No. 3,039,554. The guidance conductor of the system is normally laid out in such a way as to provide a number of different routes or stopping points and control means are provided so that a desired route and stopping points may be selected for any tug. The control means may be carried mainly by the tug itself, as described in the aforesaid patent specification. According to that specification, a count coil is located on the ground at each decision point, i.e., point of divergence or stopping point, and each tug is provided with a counter which by counting impulses received on passing successive count coils, records the location of the tug. The tug also carries a plugboard on which by the selective insertion of plugs, the desired route and stopping points can be programmed, the connections made by the plugboard being such that the appropriate decisions are made when the counter records the arrival of the tug at successive decision points. This control means has however the disadvantages that the position of the tug on the layout is not recorded absolutely but only relatively, and so error is liable to occur. Moreover if a tug can arrive at a decision point by two or more different routes, the number of count coils on each route must be the same. Also, if a tug is introduced in the system, at an arbitrary point, the counter has to be set according to the number of preceding decision points. There is also considerable duplication of equipment.

The object of the present invention is to provide an improved control means which is absolute in operation and is such that the main part of the control means can be sited at a fixed control point.

Figure 2:
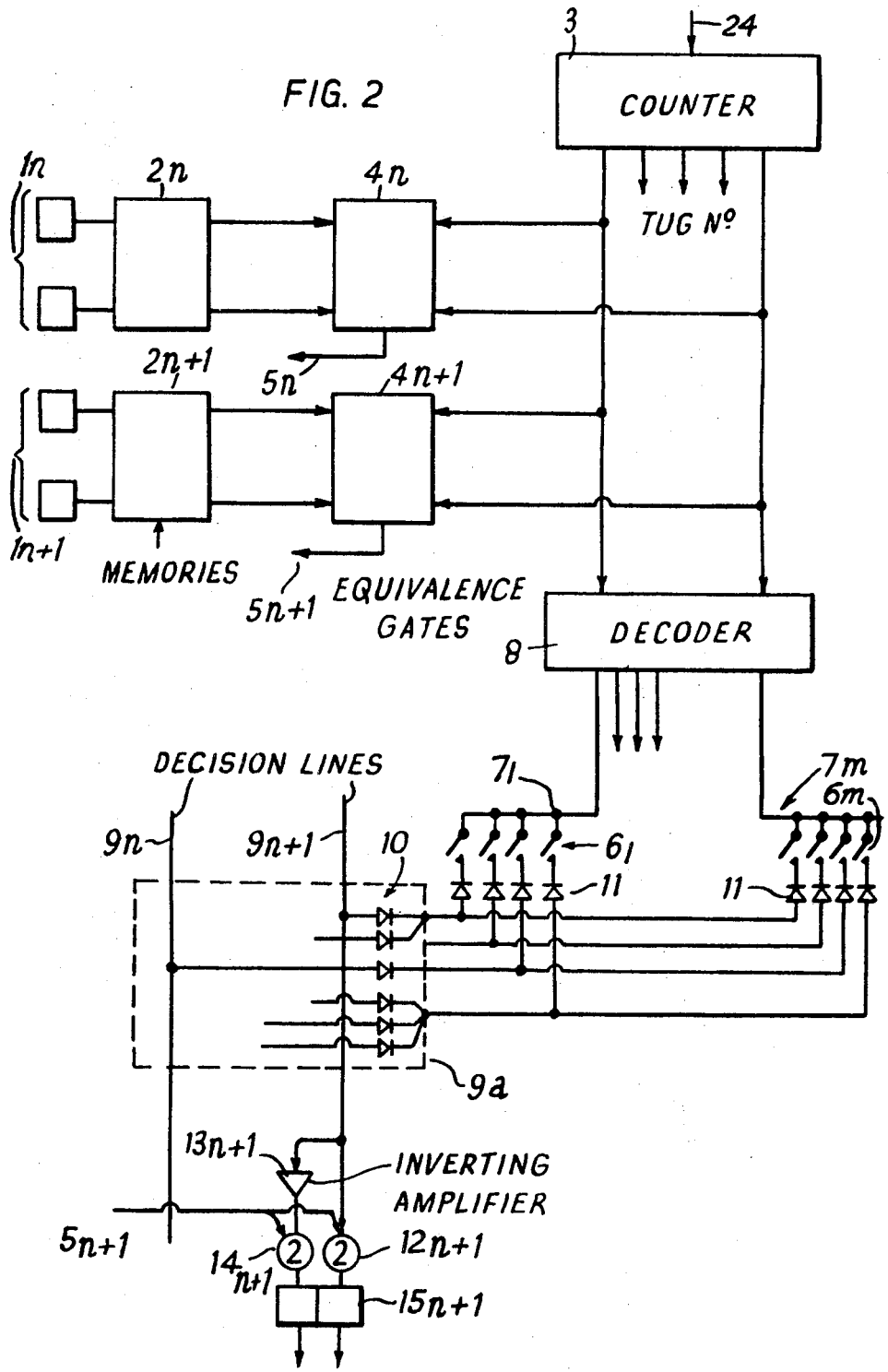

According to the present invention there is provided an automatic vehicle guidance system including,
 a. a plurality of vehicles,
 b. indicating means carried by each vehicle for indicating the identity of the respective vehicle,
 c. a plurality of decision points in the layout of the system,
 d. means associated with each decision point for deriving an identity signal representative of the identity of a vehicle arriving at the respective decision point, and
 e. control means remote from said vehicles for controlling the movement of said vehicles, said control means including,
 f. storage means conditioned to store a program of decisions for each vehicle,
 g. a plurality of decision means each adapted when actuated to cause selective control of a vehicle arriving at a respective decision point,
 h. sequencing means for sequentially conditioning said decision means according to each program of decisions in turn to a state in which they can be actuated, and
 i. means for utilizing an identity signal to actuate the decision means for the respective decision point in such a way as to render effective the respective decision stored. In order that the present invention may be clearly understood and readily carried into effect it will now be described with reference to the accompanying drawings, in which:

FIG. 1 illustrates diagrammatically part of an automatic vehicle guidance system according to one example of the invention, and FIG. 2 illustrates diagrammatically and mainly in block form the control means for the system illustrated in FIG. 1. The system, part of which is illustrated in FIG. 1 is generally similar to that described in the specification of U.S. application No. 776,058, filed Nov. 15, 1968(U.S. Pat. No. 3,540,541), and only so much is shown as is necessary to provide a background for the present invention. A tug 30 is represented as travelling in the direction of the arrow along a section $S_n$ of guidance conductor laid on or just below the ground. Movement of the tug along the section depends on the presence of both a steering signal and a run signal in the section of conductor. The steering signal is an oscillation which can be sensed by induction in two pickup coils 35 mounted on a bogey for the front wheel of the tug. The run signal on the other hand is in the form of a modulation of the steering oscillation. The output of the coils 35 is used to control the steering of the tug in such a way as to maintain the output of the two coils sensibly equal. This occurs when the bogey is centered over the guidance conductor. Moreover the driving motor of the tug is only energized when the modulation corresponding to the run signal is detected in the output of the coils 35. The sections of conductor define the routes for the tugs in the system and the few sections which are shown in FIG. 1 are denoted by the references $S_n$ to $S_{n+4}$, these sections being laid to form two branch points $P_n$ and $P_{n+1}$. The tug 30, and other tugs used in the system, carry transmitting means 31 which are normally inoperative but can be rendered operative for a short time to transmit a signal representative of the identity of a tug by means of a switch 32. A switch actuator 33 and a fixed receiver are provided at each decision point, the actuator 33 being arranged to operate the switch 32 and render the transmitting means 31 operative just when it is aligned with the respective receiver. The two receivers shown in the drawing are denoted by the references $1_n$ and $1_{n+1}$. The tugs in the system are numbered for identification purposes and the transmitting means 31 is arranged to transmit a digitally coded indication of this number. The code may be a series, series/parallel or parallel code as will appear subsequently, but in the present case it is assumed that a plurality of code elements are transmitted in parallel, the transmitting means 31 comprising a plurality of transmitting elements and each receiver including a similar plurality of receiver elements. Only two transmitting and receiving elements are represented in the drawing.

When a signal is received by a receiver 1 at a decision point it is applied to control means 34 where it is utilized in rendering operative a decision which has previously been programmed for the respective tug. At both decision points the decision lies between one or other of the two branches at transitions $P_n$ and $P_{n+1}$ respectively, but decision of other kinds may also be available, for example with regard to stopping at loading or unloading stations. Block control units are provided for each section of the guidance conductor such as the units $B_{n+1}$ and $B_{n+2}$ for the sections $S_{n+1}$ and $S_{n+2}$. On each tug there is provided transmission means which emits a so called block call signal which, when received by a particular block unit, is utilized to switch on the steering and run signals in the respective section of conductor, provided there are no inhibitions from other block units. In the drawing the transmission means for the block call signal is represented, for simplicity as a coil 36 and the receiving means, is represented simply as a pickup coil 37, near each transition located to pick up the block call signal from the coil 36. When a tug arrives at a transition the block call signal picked up by the coil 37 is fed to the block control unit or units for the next section or sections. Consider the case of the tug 30 arriving at the transition $P_n$. Just before reaching the pickup coil 37, a signal representative of the tugs identity is received by the receiver $1_n$ and passed to control means 34 where the signal is recorded and the appropriate decision is selected from the program in the control means for the respective tug. The effect of the decision is to cause one of the two block units, say $B_{n+1}$, to be rendered operative and the other to be rendered inoperative. When the block call signal is picked up by the coil 37 as the tug comes to the point $P_n$, the signal is only therefore effective in the block unit $B_{n+1}$. There, it sets a memory relay which in turn tends to operate switches and remove the steering signal and the run signal from the conductor section $S_n$ and apply them to the section $S_{n+1}$. However application of the run signal is inhibited if either sections $S_{n+3}$ or $S_{n+4}$ is energized by the steering signal. Momentum carries the tug over the small gap between the sections $S_n$ and $S_{n+1}$ (or in some cases there may be an overlap between sections) and the tug proceeds along the section $S_{n+1}$ if the run signal is applied to that section but otherwise it is stopped until sections $S_{n+3}$ and $S_{n+4}$ are clear, though steering control is maintained by the steering signal in the section $S_{n+1}$. It will be appreciated that if the program for the tug had been preset for the tug to proceed along section $S_{n+2}$ instead of $S_{n+1}$, the block control unit $B_{n+2}$ would be made operative instead of $B_{n+1}$. The control means 34 and the block units B may be located at a fixed station denoted by the dotted rectangle 40 or a number of such stations. Further details of the block control units will not be given as such details can be found in the specification of the aforesaid U.S. application No. 776,058, filed Nov. 15, 1968 U.S. Pat. No. 3,540,541. The block control units are preferably of the construction illustrated in FIG. 5 of said specification.

As indicated in FIG. 2, the receivers at the decision points apply their outputs to corresponding memories such as $2_n$, $2_{n+1}$ in the control means 34. There is one memory for each decision point. Any identity signal picked up from a tug by a receiver at a decision point is therefore recorded temporarily in a corresponding memory 2. There is also located in the control means 34 a counter 3 which receives an input of clock pulses by way of a lead 24, the rate of clock pulses being say 1 kHz. The counter 3 serves as a multiplexer for the system, and it repetitively scans the identity signals for all the tugs of the system in sequence, the modulus of the counter being sufficiently large to accommodate the full range of identity signals. The stages of the counter 3 are connected to register the count at each step in the same digital code as used for the tug identity signals in the memories 2, and the count registered at each step by the counter 3 is applied to a series of equivalence gates 4, one for each decision point, only the gates $4_n$ and $4_{n+1}$ for the receivers $1_n$ and $1_{n+1}$ being shown in the drawing. The equivalence gates 4 receive second inputs from the memories 2 and each equivalence gate produces an output signal on a lead 5 when the count registered by the counter 3 is equal to the identity signal recorded in the respective memory 2. Means not shown are provided for resetting each of the memories 2 every time a predetermined count is reached by the counter 3, on condition that no incoming identity signal is being received from a tug. This allows the memory 2 to accumulate received elements of an identity signal until the full signal is stored. If elements of the identity signal are received serially, a number of false equivalences may be detected by the respective equivalence gate 4 before the full identity signal is recorded but as will appear only the last equivalence is effective in decision making. Such false equivalences can however be avoided by using an error detecting code for the identity signals so that a signal registered in a memory can be ignored until it is free of error, that is complete.

The control means 34 also incorporates a set of program switches 6 for the different tugs of the system. Two sets of switches $6_1$ and $6_m$ for tug 1 and tug $m$ are denoted in the drawing and the system operator can determine the program of decisions for a particular tug by selective operation of the switches of the corresponding set. The sets of switches have individual energizing leads $7_1...7_m$ from a decoder 8, which receives as input signal the output of the counter 3. As the counter scans the different tug identity signals in sequence, the decoder synchronously energizes the leads 7 in sequence. In each set of switches, there are individual switches for different decision points or groups of decision points in the system and the switches when closed connect the respective lead 7 to a set of "decision" lines, of which there is one for each decision point. The two decision points shown in the system precede branch points, so that the decision lies between continuing in the same path or diverging. Thus for one decision the switch corresponding to the decision point is shut and for the other it is open. It may however be of course that a decision point precedes a stopping point in which case the decision lies between continuing or stopping. Two of the decision lines $9_n$ and $9_{n+1}$ are represented in the drawing. The connections from the switches to the decision lines are made via switch diodes 10 and 11, the diodes 10 being mounted on a diode card represented by the dotted outline 9a, As indicated, a group of decision points may be connected to one switch when a number of decisions are interdependent. At each step of the counter 3, corresponding to one tug identity signal, the decoder 8 will energize, via the corresponding lead 7 and sets of switches 6, those decision lines which are connected to the closed switches in the particular set. Therefore as the counter 3 sequentially scans the different tug identity signals, at each step a different set of decision lines has each decision line thereof either energized or not, the set of decision lines representing the program of decisions for the respective tug. However a decision can only become effective at a decision point after the correct identity signal has been received from the tug when the tug is at the particular decision point. This result is achieved by connecting each decision line to respective decision means which are operative to cause selective control of tugs arriving at a respective decision point. Thus each decision line is connected directly to a first AND gate 12 and through an inverting amplifier 13 to a second AND gate 14. The outputs of the AND gates 12 and 14 are applied to the two inputs of a bistable circuit 15. If an output is received from the AND gate 12 (that is if the corresponding switch is closed), the bistable circuit 15 is switched to the "1" state and initiates the control function required to make the tug perform the corresponding one of the two alternative actions at the respective decision point by means of the appropriate block control unit. Alternatively, if an output is received from the AND gate 14 (that is if the corresponding switch is open) the bistable is set in the "0" state and this ensures that the tug performs the other of the two alternative actions by means of the other appropriate block control unit. There is a set of decision means components 12 to 15 for each decision line, and the set which is shown in the drawing, being connected to the decision line $9_{n+1}$, is identified by the suffix $n+1$. The AND gates of each set receive actuating signals from the output of the gate 4 respective to the corresponding decision point, as indicated in the drawing by the connection of the output lead $5_{n+1}$ to the second input terminals of the two AND gates $12_{n+1}$ and $14_{n+1}$.

The receivers 1 can be located several feet ahead of the point at which a decision must become effective, so that there is adequate time for the counter 3 to run through the complete sequence of tug identity signals in the time taken for any tug to travel from the receiver to the decision point. A clock pulse rate of 1 kHz. allows for about 80 tugs in the system.

The lines 9 have been referred to generically as decision lines. In a practical arrangement it may be preferable to separate the lines corresponding to turnoff points from lines corresponding to stop points and to provide separate diode cards for the two categories of decision lines.

A number of different techniques can be used for transmitting a tug identity signal from a tug to a receiver 1 on the floor, but techniques which require only a small number of transmitting devices on a tug are preferred owing to the need to space the transmitting devices physically to avoid interaction. According to one arrangement, a receiver on the tug is arranged to sense a marker on the floor and trigger a transmitter on the tug as the tug approaches a decision point. The marker may be a permanent magnet and the receiver on the tug a reed switch. When the transmitter on the tug is triggered a number of pulses are applied to a coil on the tug equal to the number which is the identity signal for the tug. The pulses can be DC pulses, bursts of oscillation of audiofrequency, or frequency deviations of a carrier. A single coil is provided on the floor at each decision point to pick up the pulses, which are counted and converted into the correct code for the memory 2. This arrangement may however be modified by arranging that the tug transmits a coded signal in a serial code such as a telex code. In this case the code would be converted from serial to parallel form before being recorded in the memory 2.

Alternatively a parallel digital code can be used. This can be achieved by providing a series of transmitting devices, such as coils or magnets, on each tug and a cooperating number of devices on the floor in each receiver 1 (as indicated in the drawing), the identity signal being coded in a binary or ternary code. For ternary coding, one transmitting coil on the tug may transmit an oscillator of reference phase, whilst other coils transmit an inphase oscillation to represent "1" and an out of phase oscillation to represent "2," the absence of a transmitting coil representing "0". In this case each receiver 1 or memory 2 may be required to transcode the identity signal into a different code, namely that used by the counter 3, before it is recorded in the memory 2. A similar ternary coding may be practiced by using magnets on the tug and reed switches on the floor, the coding for each element being such that no magnet represents "0." a magnet with one polarity represents "1" and a magnet with opposite polarity represents "2." Each reed switch on the floor may then be biassed to a point below its holdin point so that it will be more sensitive to a magnet of one polarity than to another.

A preferred arrangement is however one which is adapted for a serial/parallel error detecting code, in which each code bit, having more than two possible values, is transmitted by a parallel binary code, the different bits being transmitted successively. The error detecting property of the code is achieved by using an "$m$ out of $n$" code for each bit so that if more or less than $m$ elements of a bit has the value 1, then the code must be in error. For example the code may be a "2 out of 4" code as follows:

| Bit no | 5 | 4 | 3 | 2 | 1 | 0 |
|---|---|---|---|---|---|---|
| code | 0011 | 0101 | 1001 | 0110 | 1010 | 1100 |

The use of this code would require four transmitting devices which may be coils or magnets on each tug and four receiving devices in each receiver 1. In this case, the equivalence gates can be arranged to ignore the output of the counter 3 until the code received from a receiver 1 is complete. Each tug is arranged to signal its identity by means of bits A, B, C... according to the rule:

tug number $= 2^A + 2^B + 2^C + \cdots$

For example tug number 25 would signal its identity by transmitting in sequence the following bits, each bit being coded in parallel:

0101, 0110, 1100

The bits are decoded by a receiver as the number:

$2^4 + 2^2 + 2^0$ namely the decimal number 25 as required.

Other error detecting codes may alternatively be used, for example, if a larger number of tugs have to be allowed for a "3 out of 6" code may be adopted.

Many modifications may be made in the example of the invention which is illustrated. For example, means for signalling the presence of a tug as it approaches a transition between two sections of the guidance conductor may be combined with the means for recording and sensing the identity of vehicles arriving at decision points.

What I claim is:

1. An automatic vehicle guidance system including,
   a. a plurality of vehicles, each vehicle having means for causing it when moving to follow a given guidance path,
   b. indicating means carried by each vehicle for indicating the identity of the responsive vehicle,
   c. a plurality of decision points in the layout of the system,
   d. means associated with each decision point for deriving an identity signal representative of the identity of a vehicle arriving at the respective decision point, and
   e. control means remote from said vehicles for controlling the movement of said vehicles, said control means including,
   f. storage means conditioned to store a program of decisions for each vehicle,
   g. a plurality of decision means said adapted when actuated to cause selective control of a vehicle arriving at a respective decision point,
   h. sequencing means adapted to sequentially condition said decision means according to each program of decisions in turn to a state in which they can be actuated, and
   i. means for utilizing an identity signal to actuate the decision means for the respective decision point in such a way as to render effective the respective decision stored.

2. An automatic vehicle guidance system according to claim 1 wherein said means for utilizing an identity signal include,
   a. a plurality of memory devices, one for each decision point, for storing the identity signal of a vehicle arriving at the respective decision point,
   b. means for sensing said memory devices for the different identity signals taken in turn in synchronism with the operation of said sequencing means, and
   c. means for applying an actuating signal to the respective decision means when an identity signal is sensed in a memory device by said sensing means.

3. An automatic vehicle guidance system according to claim 2 in which said means for deriving an identity signal is adapted so that it is rendered effective in sufficient time to allow the sensing of said memory devices by said sensing means and the conditioning of said decision means according to each program of decisions in turn to be completed by the time the vehicle reaches the decision point.

4. An automatic vehicle guidance system according to claim 1 in which said decision points are branch points in the layout of the system.

5. An automatic vehicle guidance system according to claim 1 in which said decision points are stations at which the vehicle may stop.

6. An automatic vehicle guidance system including,
   a. a plurality of vehicles, each vehicle having means for causing it when moving to follow an energized guidance conductor,
   b. indicating means carried by each vehicle for indicating the identity of the respective vehicle,
   c. a plurality of decision points in the layout of the system,
   d. means associated with each decision point for deriving an identity signal representative of the identity of a vehicle arriving at the respective decision point, and
   e. control means remote from said vehicles for controlling the movement of said vehicles, said control means including,
   f. storage means conditioned to store a program of decisions for each vehicle,
   g. a plurality of decision means each adapted when actuated to cause selective control of a vehicle arriving at a respective decision point,
   h. sequencing means adapted to sequentially condition said decision means according to each program of decisions in turn to a state in which they can be actuated, and
   i. means for utilizing an identity signal to actuate the decision means for the respective decision point in such a way as to render effective the respective decision stored.

7. An automatic vehicle guidance system according to claim 6, wherein said means for utilizing an identity signal include,
   a. a plurality of memory devices, one for each decision point, for storing the identity signal of a vehicle arriving at the respective decision point,
   b. means for sensing said memory devices for the different identity signals taken in turn in synchronism with the operation of said sequencing means, and
   c. means for applying an actuating signal to the respective decision means when an identity signal is sensed in a memory device by said sensing means.

8. An automatic vehicle guidance system according to claim 7 in which said means for deriving an identity signal is adapted so that it is rendered effective in sufficient time to allow the sensing of said memory devices by said sensing means and the conditioning of said decision means according to each program of decisions in turn to be completed by the time the vehicle reaches the decision point.

UNITED STATES PATENT OFFICE
CERTIFICATE OF CORRECTION

Patent No. 3,610,363          Dated October 5, 1971

Inventor(s) FREDERICK WALTER HARTLEY

It is certified that error appears in the above-identified patent and that said Letters Patent are hereby corrected as shown below:

Title page, between lines 6 and 7, insert

-- [73] Assignee  ELECTRIC & MUSICAL INDUSTRIES LIMITED
                  Hayes, Middlesex, England --

Signed and sealed this 25th day of July 1972.

(SEAL)
Attest:

EDWARD M. FLETCHER, JR.           ROBERT GOTTSCHALK
Attesting Officer                 Commissioner of Patents